Dec. 31, 1957 R. C. A. ELAND 2,818,472

NEUTRALIZED TRIODE TUNER

Filed Feb. 18, 1955

INVENTOR.
ROBERT ELAND
BY
Ostrolenk & Faber
ATTORNEYS

United States Patent Office 2,818,472

Patented Dec. 31, 1957

2,818,472

NEUTRALIZED TRIODE TUNER

Robert C. A. Eland, Arcadia, Calif., assignor to Standard Coil Products Co., Inc., Los Angeles, Calif., a corporation of Illinois Application February 18, 1955, Serial No. 489,041

3 Claims. (Cl. 179—171)

The present invention relates to television tuners and more particularly it relates to improvements in the radio frequency amplifier section of such tuners.

Television tuners or frequency selectors are generally provided with three sections, a preselector, an oscillator and mixer. The preselector consists generally of the radio frequency amplifier which may be a single pentode or triode or a cascode type amplifier.

It is found, in particular, that when a triode is used as the amplifying element, considerable difficulty is encountered in its neutralization. Neutralization, in fact, becomes critical when maximum gain is to be obtained. This difficulty in neutralization was found to be caused by the improper phase relation due to lead inductances in the preselector circuit.

The amplifier of the present invention uses a single triode neutralized so that maximum gain can be obtained, gain which is comparable to that of a pentode or cascode amplifier resulting in a television tuner of good performance, in fact, as good as the cascode type tuner but considerably less expensive.

Accordingly, one object of the present invention is the provision of means for neutralizing a triode so that it can operate at maximum gain at radio frequencies.

Still another object of the present invention is the provision of means for reducing lead inductances in the radio frequency amplifier section of a television tuner.

Another object of the present invention is a television tuner of good performance utilizing only a single triode in its radio frequency section.

A further object of the present invention is a television tuner more inexpensive than one provided with a pentode R. F. amplifier and having a performance comparable to that using a cascode R. F. amplifier.

In television tuners, the balanced television signal is transformed by means of a balun into an unbalanced signal to be applied to the grid circuit of the radio frequency amplifier tube. In pentode type R. F. amplifiers, the unbalanced signals are applied between the grid and the cathode of the amplifier. In cascode type R. F. amplifiers, the unbalanced signal is applied also between the grid and the cathode or the first triode section, that is, the grounded cathode section.

In the tuner of the present invention, a single triode tube is used as the R. F. amplifying element in place of a pentode or a cascode circuit, thus resulting in a cheaper tuner having the same performance of a cascode type tuner. The unbalanced signal in the present invention is also applied to the grid of a triode amplifier.

More specifically, the unbalanced signal is applied to the grid of a triode amplifier through a coupling capacitor which is mounted on the center conductor of a feed-through capacitor, the center conductor of which carries the television signal from outside the tuner to the internal circuitry. By this simple means, input lead inductances are considerably reduced and good neutralization for maximum gain can now be obtained by the appropriate selection of a capacitance value between the plate and the grid of the triode amplifier.

Another object of the present invention is therefore the provision of a coupling capacitor mounted on a feed-through capacitor for reducing the inductances.

Still another object of the present invention is the feed-through capacitor in which an outer plate is grounded and a second outer plate serves as a terminal of a second capacitor; the third terminal consisting of the center conductor of this capacitor.

These and other objects of the present invention will become apparent from the following description taken in connection with the drawings, in which.

Figure 1:
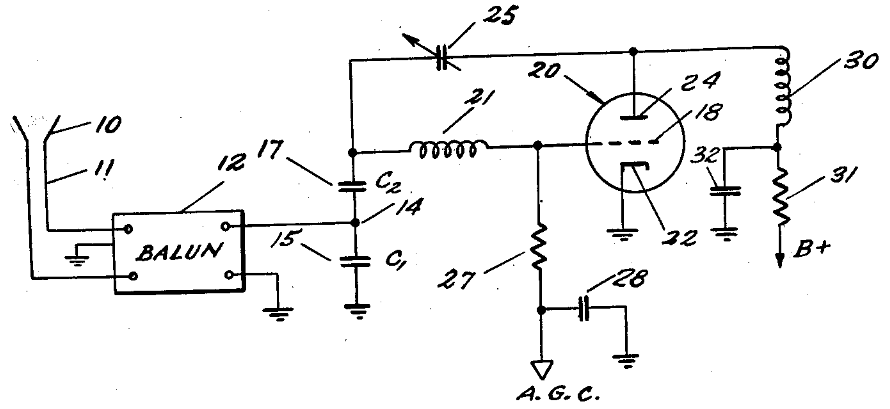
Figure 1 is a schematic circuit diagram of the radio frequency amplifier of the present invention.

Referring first to Figure 1 the balanced television antenna is denoted by numeral 10, the transmission line by numeral 11 and the balance-to-unbalance transformer shown as a block is denoted by numeral 12 and could be of any desired type.

One output terminal of the balun 12 is connected to the ground while the other output terminal is connected to junction point 14 to which are connected the feed-through capacitor 15 and the coupling capacitor 17. To coupling capacitor 17 is connected the grid 18 of triode amplifier 20 through a series inductance 21. Triode 20 has its cathode 22 grounded and its plate 24 connected to the junction point between capacitor 17 and inductance 21 through a variable capacitance 25.

Variable capacitor 25 as will be described hereinafter serves as a neutralizing device. Grid 18 of tube 20 is also connected to an A. G. C. terminal through a resistor 27 by-passed to ground by capacitor 28. Plate 24 of R. F. amplifier 20 is connected to an output coil 30 connected in series with a dropping resistor 31 in turn connected to the B+ supply. Resistor 31 is by-passed to ground by a capacitor 32.

Coupled to output coil 30 may be, for example, the tuning coil of the mixer of this television tuner.

The present invention is particularly directed to the reduction of lead inductances in the input circuit of triode amplifier 20. This is obtained by the novel construction of the feed-through capacitor 15 (see also Figures 2 and 3).

Figure 2:
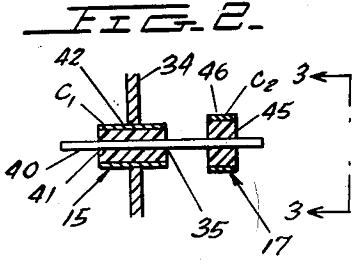
Figure 2 is a cross-sectional view of the feed-through capacitor assembly of the present invention.
Figure 3:
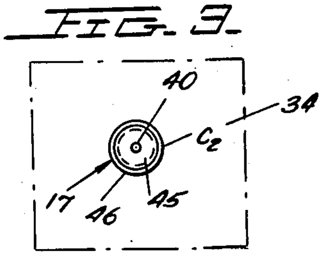
Figure 3 is a front view of the feed-through capacitor of the present invention.

Referring to Figures 2 and 3, numeral 34 refers to a portion of a metallic chassis housing the tuner circuit of the present invention. This portion of housing 34 is provided with an opening 35 through which can be inserted feed-through capacitor 15. Feed-through capacitor 15 consists of an inner conductor 40, a dielectric sleeve 41 surrounding conductor 40 and a metallic plating, possibly silver, 42 around the cylindrical surface of dielectric sleeve 41. When feed-through capacitor 15 is inserted in opening 35 of chassis 34, electrical connection is obtained between the metallic plate 42 and chassis 34, thus effectively grounding plate 42 of feed-through capacitor 15. The inner conductor 40 extends through dielectric sleeve 41 and carries a second dielectric sleeve 45 in the interior of chassis 34.

The dielectric material for sleeve 41 may be any suitable low-loss material at high frequencies. It has been found that ceramic is suitable, particularly where the layer 42 is plated thereon. Other materials may be used such as plastic, polyetholane, or other compositions well known in the art.

The layer 42 in place of plating may be foil, metal sheeting or tubing, as desired. Furthermore, the dielectric sleeve 41 may extend and be contiguous with the sleeve 45 shown separated therefrom in Figure 2. The layer 46 about sleeve 45 may be of suitable conductive material as herein set forth.

Dielectric sleeve 45 is also silver plated at 46 so that a capacitance is obtained between inner conductor 40 and plating 46, the magnitude of the capacitance being determined by the dimensions of plating 46 and the dielectric constant of the dielectric sleeve 45. The capacitance existing between conductor 40 and plating 46 corresponds to the previously mentioned coupling capacitance 17. When the feed-through capacitor shown in Figures 2 and 3 is applied to the circuit of Figure 1, then the ungrounded output terminal of balun 12 is connected to the inner conductor 40 of feed-through capacitor 15 on one side of chassis 34.

The electrical contact between chassis 34 and plating 42 essentially grounds one plate of feed-through capacitor 15 as shown in Figure 1. On the other side of chassis 34 is mounted capacitor 17, the plating 46 of which is connected in any appropriate way to both inductance 21 and the variable neutralizing capacitor 25. Because of the novel construction of feed-through capacitor 15 and coupling capacitor 17, the lead inductances in the input circuit of R. F. amplifier tube 20 are considerably reduced and neutralization and maximum gain can now be obtained by the proper selection of capacitance 25.

In the foregoing, the present invention has been described solely in connection with specific illustrative embodiments thereof. Since many variations and modifications of the invention will now be obvious to those skilled in the art, I prefer to be bound not by the specific disclosures herein contained, but only by the appended claims.

I claim:

1. In a television tuner having a neutralized triode amplifier circuit and a metallic chassis enclosure therefor; a feed through capacitor extending through an opening in said chassis having a central conductor for coupling external radio frequency signals to the input of said enclosed neutralized triode amplifier circuit; dielectric material surrounding intermediate portions of said conductor, a first conductive layer surrounding said dielectric material defining a first condenser directly coupled with said conductor and a second conductive layer spaced from said first conductive layer and surrounding said dielectric material defining a second condenser directly coupled with said conductor; said first conductive layer being aligned with and connected to said chassis; said second conductive layer being positioned within said enclosure and being connectible to the input of said amplifier circuit, thereby minimizing intercoupling inductance between the external signals and the input through said enclosure.

2. In a television tuner having a neutralized triode amplifier circuit and a metallic chassis enclosure therefor; a feed through capacitor extending through an opening in said chassis having a central conductor for coupling external radio frequency signals in capacitive relation with negligible lead inductance to the input of said enclosed neutralized triode amplifier circuit; dielectric material surrounding intermediate portions of said conductor, a first conductive layer surrounding said dielectric material defining a first condenser directly coupled with said conductor and a second conductive layer spaced from said first conductive layer and surrounding said dielectric material defining a second condenser directly coupled with said conductor; said first conductive layer being aligned with and connected to said chassis; said second conductive layer being positioned within said enclosure and being connectible to the input of said amplifier circuit, thereby minimizing intercoupling inductance between the external signals and the input through said enclosure; the output of said triode and said second conductive layer being connected through a neutralizing condenser for neutralizing the triode amplifier circuit for high gain at radio frequencies.

3. In a television tuner having a neutralized triode amplifier circuit and a metallic chassis enclosure therefor; a feed through capacitor extending through an opening in said chassis having a central conductor for coupling external radio frequency signals in capacitive relation with negligible lead inductance to the input of said enclosed neutralized triode amplifier circuit; dielectric material surrounding intermediate portions of said conductor, a first conductive layer surrounding said dielectric material defining a first condenser directly coupled with said conductor and a second conductive layer spaced from said first conductive layer and surrounding said dielectric material defining a second condenser directly coupled with said conductor; said conductor and first and second conductive layers being positioned in fixed relationship with respect to said surrounding dielectric material; said first conductive layer being aligned with and connected to said chassis; said seecond conductive layer being positioned within said enclosure and being connectible to the input of said amplifier circuit, thereby minimizing intercoupling inductance between the external signals and the input through said enclosure; the output of said triode amplifier circuit and said second conductive layer being connected through a neutralizing condenser for neutralizing the triode amplifier circuit for high gain at radio frequencies.

References Cited in the file of this patent

UNITED STATES PATENTS

| | | |
|---|---|---|
| 2,226,694 | Buschbeck | Dec. 31, 1940 |
| 2,270,953 | Manz | Jan. 27, 1942 |
| 2,398,050 | Schreiner | Apr. 9, 1946 |
| 2,569,667 | Harvey | Oct. 2, 1951 |
| 2,589,092 | Kihn | Mar. 11, 1952 |
| 2,686,903 | Pan | Aug. 17, 1954 |
| 2,709,788 | Schmidt | May 31, 1955 |
| 2,714,192 | Pan | July 26, 1955 |

FOREIGN PATENTS

| | | |
|---|---|---|
| 678,384 | Great Britain | Sept. 3, 1952 |